May 6, 1952  J. C. BATH ET AL  2,595,917
ADJUSTABLE AND RETRACTABLE INTERNAL THREAD GAUGE
Filed July 20, 1949
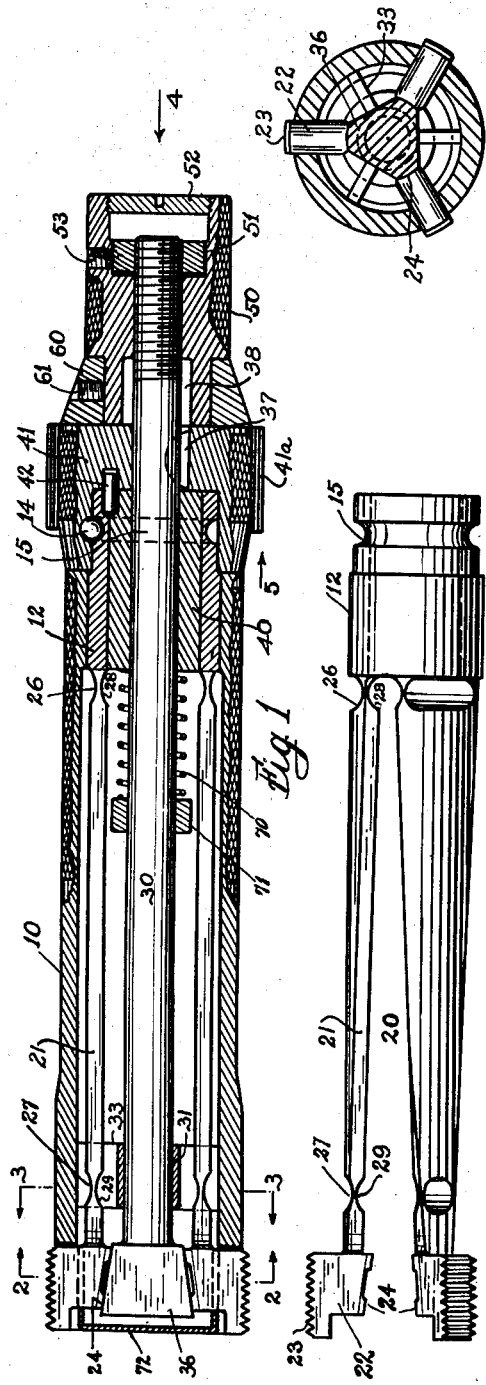
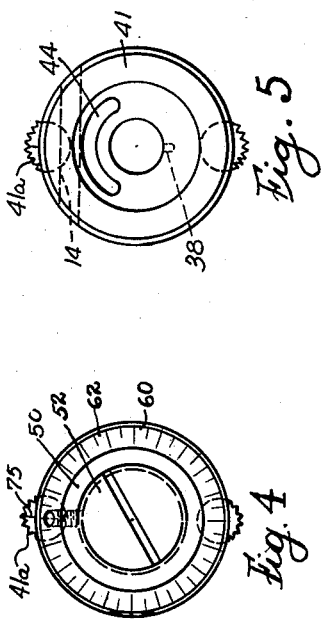
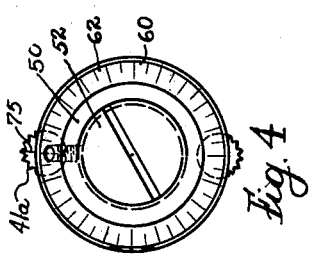
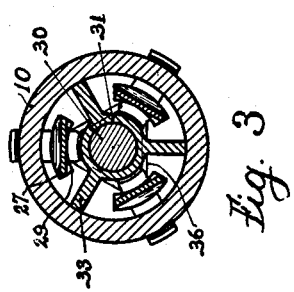
INVENTOR.
JOHN CHESTER BATH.
ERVIN L. ACKLEY.
BY Chas. T. Hawley.
ATTORNEY Patented May 6, 1952

2,595,917

UNITED STATES PATENT OFFICE 2,595,917

ADJUSTABLE AND RETRACTABLE INTERNAL THREAD GAUGE

John Chester Bath, Worcester, and Ervin L. Ackley, Northboro, Mass., assignors to John Bath & Company, Worcester, Mass., a corporation of Massachusetts Application July 20, 1949, Serial No. 105,782

4 Claims. (Cl. 33—178)

This invention relates to an adjustable internal thread gauge of the general type in which the gauge jaws may be retracted or collapsed to facilitate entrance or removal of the gauge with respect to the work.

It is the general object of our invention to provide improved and simplified mechanism for releasing the gauge jaws and for thereafter restoring the jaws to operative position and without disturbing the gauge setting.

We also provide improved adjusting mechanism and an improved indicating device which may be easily reset to any selected zero position.

Our invention further relates to arrangements and combinations of parts which will be hereinafter described and more particularly pointed out in the appended claims.

A preferred form of our invention is shown in the drawings, in which

Fig. 1 is a sectional side elevation of an internal thread gauge embodying our invention;

Figs. 2 and 3 are transverse sectional elevations, taken along the lines 2—2 and 3—3 in Fig. 1 respectively;

Fig. 4 is an end view, looking in the direction of the arrow 4 in Fig. 1;

Fig. 5 is an end view of a cam-operating collar, looking in the direction of the arrow 5 in Fig. 1; and Fig. 6 is a side elevation of the gauge jaw assembly.

Referring to the drawings, our improved gauge comprises a tubular body 10 in which a gauge jaw assembly 12 (Fig. 6) is pressed or otherwise secured.

The gauge jaw assembly is deeply slotted as indicated at 20 in Fig. 6 to provide a plurality of arms 21 for separate gauge jaws 22. Each gauge jaw has a threaded outer surface 23 and a segmental internal conical face 24.

The arms 21 are resilient and each arm is provided with transverse grooves 26 and 27 on its outer surface and preferably with corresponding transverse grooves 28 and 29 on its inner surface. These grooves reduce the thickness of the separate spring arms and increase the flexibility thereof. The arms are so tensioned that they each tend to move inward or toward the gauge axis when released.

A rod 30 is slidable in a bearing 31 which is centered in the body 10 by spaced arms 33 (Fig. 3). The outer end of the rod 30 is provided with a triangular cam portion 36 (Fig. 2) which engages the conical inner faces 24 of the gauge jaws 22. The outside diameter of the gauge may be adjusted by moving the rod 30 axially, and the gauge jaws 22 may be released for inward movement by turning the rod 30 and cam 36 sixty degrees.

The provision made for adjusting and turning the rod 30 will now be described. The rod 30 extends through a bearing bushing 40 mounted in the right-hand end portion of the gauge jaw assembly 12, as viewed in Fig. 1.

A sleeve 41 is loosely mounted on the inner end portion of the jaw assembly 12 and is rotatably secured by a cross pin 14 seating in a groove 15 in said inner end portion. Scored lugs 41a on the sleeve 41 make it easier to give the sleeve a manual rotational movement.

The sleeve 41 is secured from angular displacement on the rod 30 by a key 37 in the rod 30 which is slidable in a keyway 38 in the sleeve 41. The rod 30 is freely movable axially through the bushing 40 and through the sleeve 41. A pin 42 is fixed in the end of the assembled parts 12 and 40 and extends into a segmental slot 44 (Fig. 5) in the sleeve 41. The slot 44 is of such length that the sleeve 41 may be shifted angularly sixty degrees. As the sleeve is keyed to the rod 30, the rod 30 will also be shifted sixty degrees, thus moving the cam 36 from operative to inoperative position and vice versa.

A very simple construction is thus provided for releasing the gauge jaws and for thereafter restoring the gauge jaws to operative or gauging position and without disturbing the adjusted gauge diameter.

The outer end of the rod 30 is threaded to receive a hand nut 50 which may be turned relative to the rod 30 and sleeve 41 to shift the rod 30 endwise and to thus vary the axial position of the cam 36 and the radial positions of the gauge jaws 22.

An inner nut 51 is provided which abuts an end surface of the hand nut 50 and which may be adjusted to take up any back-lash between the nut and the screw thread. The nut 51 may be secured by a clamping screw 53. A threaded plug 52 closes the end of the hand nut 50.

A graduated collar 60 is loosely mounted on a tubular extension of the hand nut 50 and may be secured in angularly adjusted position by a clamping screw 61. The collar 60 is graduated as indicated at 62 (Fig. 4). A spring 70 engages a collar 71 on the plunger 30 and shifts the plunger to the left to take up lost motion when the nut 50 is unscrewed. A cap 72 closes the end of the gauge.

When the gauge is in use, the nut 50 may be adjusted so that the gauge jaws will fit snugly in a standard nut, and the collar 60 may then be adjusted to the zero position with respect to a conventional datum line or index mark 75 (Fig. 4) on the adjacent portion of the sleeve 41. The graduations on the collar 60 may then be read with respect to the index mark to directly indicate any variation from standard size.

The utility and advantages of our improved gauge will be readily apparent. The gauge may be inserted in a threaded hole by turning the sleeve 41 so that the cam 36 will permit the jaws 22 to be retracted by their inherent resilience. The sleeve 41 is then reversely shifted to project the gauge jaws outward, and the exact amount of the variation from standard size will be indicated by the graduations 62 on the collar 60.

Having thus described our invention and the advantages thereof, we do not wish to be limited to the details herein disclosed, otherwise than as set forth in the claims, but what we claim is:

1. An adjustable internal thread gauge comprising a tubular body portion, a gauge jaw assembly secured in said body portion and comprising a plurality of gauge jaws, and each gauge jaw having a conical inner face, a rod mounted for axial movement and for rotation about its axis in said assembly, said rod having a segmentally-interrupted conical cam portion at one end juxtaposed with respect to said gauge jaws and engaging said conical inner faces and a screw thread at the opposite end, an adjusting hand nut threaded on said rod, and additional manual means to rotate said rod about its axis to render said cam portions operative or inoperative with respect to said gauge jaws.

2. The combination in an adjustable internal thread gauge as set forth in claim 1, in which means is provided to limit the manual rotational movement of said rod and cam.

3. The combination in an adjustable internal thread gauge as set forth in claim 1, in which the additional manual means comprises a sleeve which is rotatably mounted coaxial with the body and gauge jaw assembly and which is slidably keyed to said rod, and in which means is provided to limit the rotational movement of said sleeve by said rod.

4. The combination in an adjustable internal thread gauge as set forth in claim 1, in which the additional manual means comprises a sleeve which is rotatably mounted coaxial with the body and gauge jaw assembly and which is slidably keyed to said rod, and in which a pin fixed with respect to said gauge jaw assembly extends longitudinally into a segmental slot in said sleeve and limits rotational movement thereof.

JOHN CHESTER BATH.
ERVIN L. ACKLEY.

REFERENCES CITED

The following references are of record in the file of this patent:

UNITED STATES PATENTS

| Number | Name | Date |
|---|---|---|
| 953,282 | Nash | Mar. 29, 1910 |
| 1,577,099 | Bath | Mar. 16, 1926 |
| 1,631,019 | Darlington | May 31, 1927 |
| 2,249,954 | Hellberg et al. | July 22, 1941 |

FOREIGN PATENTS

| Number | Country | Date |
|---|---|---|
| 151,768 | Great Britain | Oct. 7, 1920 |